B. J. COBB.
RESILIENT WHEEL.
APPLICATION FILED MAR. 13, 1913.
1,146,237.
Patented July 13, 1915.
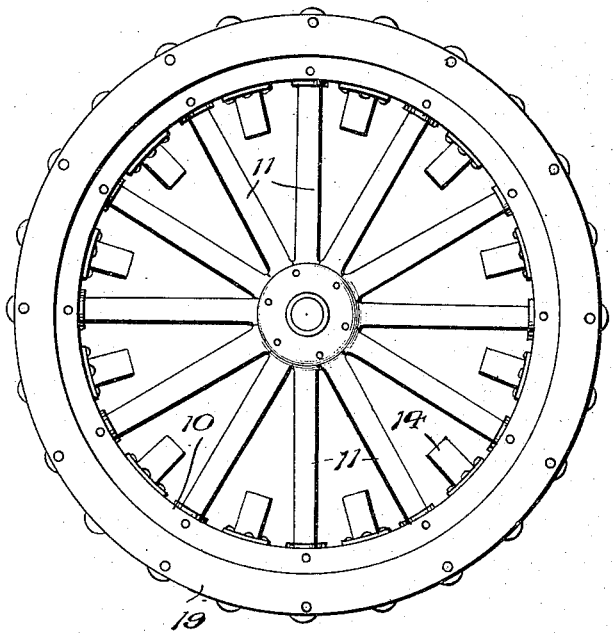
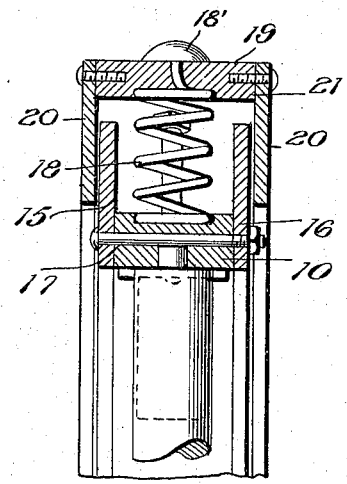
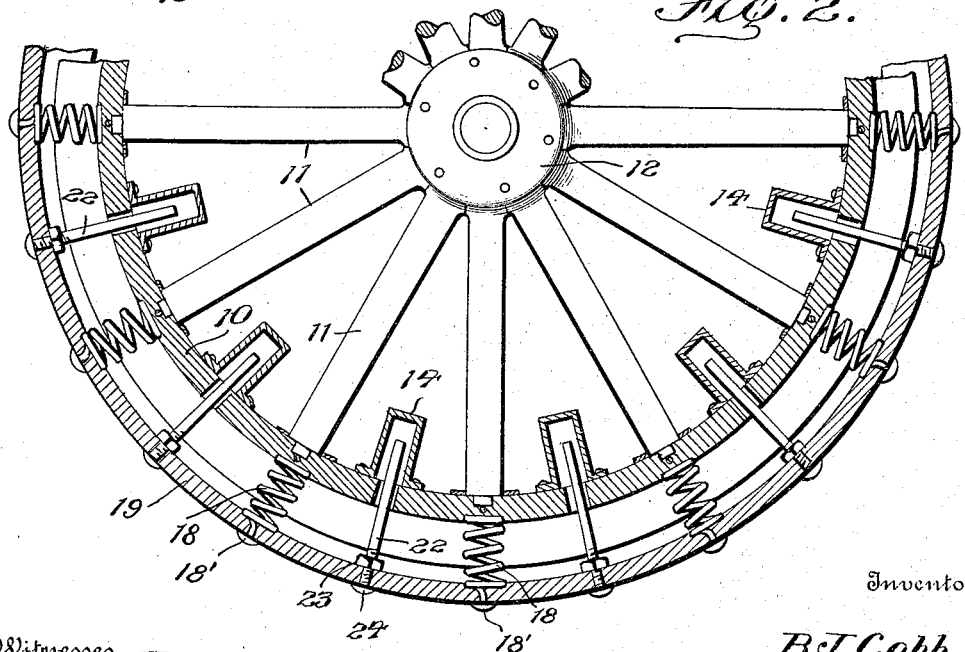
Inventor
B. J. Cobb.
By
Attorneys.

United States Patent Office.

BENJAMIN J. COBB, OF ROME, GEORGIA.

RESILIENT WHEEL.

1,146,237. Specification of Letters Patent. Patented July 13, 1915.

Application filed March 13, 1913. Serial No. 754,111.

*To all whom it may concern:*

Be it known that I, BENJAMIN J. COBB, citizen of the United States, residing at Rome, in the county of Floyd and State of Georgia, have invented certain new and useful Improvements in Resilient Wheels, of which the following is a specification.

This invention relates to an improvement in resilient wheels.

The primary object of the present invention is to provide a wheel for trucks and the like which will have the same resiliency as the rubber tired wheels now in use, and which will not be subject to the many disadvantages of cushion tired or pneumatic tired wheels.

A further object of the invention is to provide a mechanism which, while sufficiently resilient, will be substantial and in which the spring cushioning means will not be distorted or disarranged when a heavy load is applied or when the wheel meets with an obstruction.

For a full understanding of the invention, reference is to be had to the following description and accompanying drawing, in which:

Figure 1 is a side elevation; Fig. 2 is a sectional view of a portion of the wheel; Fig. 3 is a transverse section.

Corresponding and like parts are referred to in the following description and indicated in all the views of the drawing by the same reference characters.

The wheel consists of spaced inner and outer rims. The inner rim 10 is supported by the spokes 11 which are secured to the hub 12. This inner rim intermediate the spokes is provided with openings 13, and secured to the rim and surrounding the openings are housings 14, the housings being disposed on the inner face of the rim. A plurality of plates 15 and 16 are secured to the rim 10 by means of bolts 17, thereby forming a channeled rim or felly. The periphery of the rim is provided at intervals, and preferably at points in alinement with the spokes, with sockets in which are seated coiled springs 18.

The outer rim 19 is provided with any suitable form of anti-skid construction, and secured to said rim are plates 20 which embrace the plates 15, the two sets of plates sliding with respect to each other as the hub becomes eccentric to the outer rim. The inner face of the rim 19 is provided with sockets 21 which aline with the sockets 17 formed on the periphery of the inner rim, the springs 18 in this manner being supported against displacement.

A plurality of guide rods or plungers 22 are supported by the outer rim throughout its entire circumference, said guide rods extending through the openings 13 formed in the inner rim being received by the housings 14. These guide rods are maintained against displacement by nuts 23 which are threaded on the same adjacent their terminals, the outer rim being clamped between said nuts and the heads 24 of the rods.

The openings 13 in the inner rim are sufficiently large to allow for a certain amount of movement of the rods. It will be noted, however, that the rims are maintained properly assembled by means of these rods, and that while they may participate in the necessary movement to sufficiently cushion the axle, the springs will not be distorted or displaced by the pressure of the load or the contact of the wheel with an obstruction.

It will also be seen that the mechanism is effectually housed, and that foreign matter will not enter between the rims to affect their cushioning movement.

Particular attention is called to the fact that the entire structure may be easily and economically manufactured, and that the various parts may be readily assembled.

Attention is called to the fact that the heads 24 of the rods extend beyond the outer rim and form effectual anti-skidding devices. It will also be seen that the terminals of the springs may be connected with the studs 18', thereby preventing the displacement of said studs, the studs either being formed integral with the terminals of the springs or secured thereto in any suitable manner.

Having thus described my invention, what I claim as new and desire to secure by Letters Patent is:

A resilient wheel including spokes, an inner rim supported by the spokes, an outer rim arranged concentric to the inner rim, said inner and outer rims being recessed upon their confronting faces to provide oppositely disposed sockets, helical springs interposed between the rims and having their terminal convolutions seating in said sockets, the said springs being disposed in alinement with the spokes and each provided at one extremity with a head disposed to project radially beyond the outer face of the outer rim, radially disposed guide rods secured to the outer rim and extending through the inner rim, the inner rim having apertures formed therein to loosely receive said rods, said rods also being provided with heads arranged to project radially beyond the outer face of the outer rim and one of said rods being disposed between each pair of spokes, and a housing secured to the inner face of the inner rim and inclosing the inner extremity of each of said rods.

In testimony whereof I affix my signature in presence of two witnesses.

BENJAMIN J. COBB. [L. S.]

Witnesses:
C. A. THORNWELL,
SAM JOHNSTON.

Copies of this patent may be obtained for five cents each, by addressing the "Commissioner of Patents, Washington, D. C."